US009392752B2

(12) United States Patent
Doughty (10) Patent No.: US 9,392,752 B2
(45) Date of Patent: Jul. 19, 2016

(54) PLASMA GROWTH LAMP FOR HORTICULTURE (71) Applicant: Topanga USA, Inc., Canoga Park, CA (US)

(72) Inventor: Douglas A. Doughty, Gilroy, CA (US)

(73) Assignee: Topanga USA, Inc., Canoga Park, CA (US)

( * ) Notice: Subject to any disclaimer, the term of this patent is extended or adjusted under 35 U.S.C. 154(b) by 224 days.

(21) Appl. No.: 14/277,024

(22) Filed: May 13, 2014

(65) Prior Publication Data

US 2015/0327445 A1 Nov. 19, 2015

(51) Int. Cl.
H05B 31/26 (2006.01)
A01G 7/04 (2006.01)
H01J 65/04 (2006.01)

(52) U.S. Cl.
CPC ............... A01G 7/045 (2013.01); H01J 65/042 (2013.01)

(58) Field of Classification Search
CPC ........................................................ H05H 1/24
USPC .................... 315/39, 111.21, 111.41, 111.51, 315/111.61, 111.71; 313/231.1, 231.41, 313/231.51, 231.61, 231.71
See application file for complete search history.

(56) References Cited

U.S. PATENT DOCUMENTS

| 3,943,403 | A | 3/1976 | Haugsjaa et al. |
| 3,943,404 | A | 3/1976 | McNeill et al. |
| 4,001,631 | A | 1/1977 | McNeill et al. |
| 4,001,632 | A | 1/1977 | Haugsjaa et al. |
| 4,002,944 | A | 1/1977 | McNeill et al. |
| 4,065,701 | A | 12/1977 | Haugsjaa et al. |
| 4,185,228 | A | 1/1980 | Regan |
| 4,498,029 | A | 2/1985 | Yoshizawa et al. |
| 4,597,035 | A | 6/1986 | Lettenmeyer |
| 4,774,637 | A | 9/1988 | Budde et al. |
| 4,975,655 | A | 12/1990 | Dawson et al. |
| 5,615,947 | A | 4/1997 | Shambo et al. |
| 5,637,963 | A | 6/1997 | Inoue et al. |
| 5,686,793 | A | 11/1997 | Turner et al. |
| 5,708,331 | A | 1/1998 | Vamvakas et al. |
| 5,757,130 | A | 5/1998 | Dolan et al. |

(Continued)

FOREIGN PATENT DOCUMENTS

JP 2004-139852 A 5/2004

OTHER PUBLICATIONS

Bogaerts, et al., "Gas Discharge Plasmas and their Applications," Spectrochimica Acta, Part B 57, 2002, pp. 609-658.

(Continued)

Primary Examiner — Minh D A
(74) Attorney, Agent, or Firm — Kilpatrick Townsend & Stockton LLP (57) ABSTRACT A lamp apparatus for horticulture lighting is disclosed. The lamp apparatus is a high intensity electrodeless plasma lamp with an optimized spectrum for horticulture applications. The spectrum is provided from single light source and consists of peaks in the blue range of the spectrum, 400 nm to 470 nm, needed for early growth cycle of the plant as well as peaks in the red range of the spectrum, 600 nm to 700 nm, desirable for flowering cycle while providing lower amount of light in the green spectral region which is typically reflected by the plants. The ratio of the red spectrum to blue spectrum provided by the lamp can be varied by adjusting the RF power to the lamp.

20 Claims, 10 Drawing Sheets (56) References Cited

U.S. PATENT DOCUMENTS

| | | | |
|---|---|---|---|
| 5,777,857 A | 7/1998 | Degelmann | |
| 5,834,895 A | 11/1998 | Dolan et al. | |
| 5,838,108 A | 11/1998 | Frank et al. | |
| 5,841,233 A | 11/1998 | Ury et al. | |
| 5,852,339 A | 12/1998 | Hamilton et al. | |
| 5,886,480 A | 3/1999 | Penzenstadler et al. | |
| 5,923,122 A | 7/1999 | Frank et al. | |
| 6,137,237 A | 10/2000 | MacLennan et al. | |
| 6,241,369 B1 | 6/2001 | Mackiewicz | |
| 6,323,601 B1 | 11/2001 | Klein et al. | |
| 6,348,669 B1 | 2/2002 | Rudd Little et al. | |
| 6,372,186 B1 | 4/2002 | Fencl et al. | |
| 6,476,557 B1 | 11/2002 | Leng et al. | |
| 6,617,806 B2 | 9/2003 | Kirkpatrick et al. | |
| 6,737,809 B2 | 5/2004 | Espiau et al. | |
| 6,856,092 B2 | 2/2005 | Pothoven et al. | |
| 6,922,021 B2 | 7/2005 | Espiau et al. | |
| 7,119,641 B2 | 10/2006 | Petrov et al. | |
| 7,291,785 B2 | 11/2007 | Riester et al. | |
| 7,291,985 B2 | 11/2007 | Espiau et al. | |
| 7,348,732 B2 | 3/2008 | Espiau et al. | |
| 7,350,936 B2 | 4/2008 | Ducharme et al. | |
| 7,358,678 B2 | 4/2008 | Espiau et al. | |
| 7,362,054 B2 | 4/2008 | Espiau et al. | |
| 7,362,055 B2 | 4/2008 | Espiau et al. | |
| 7,362,056 B2 | 4/2008 | Espiau et al. | |
| 7,372,209 B2 | 5/2008 | Espiau et al. | |
| 7,391,158 B2 | 6/2008 | Espiau et al. | |
| 7,719,195 B2 | 5/2010 | DeVincentis et al. | |
| 7,830,092 B2 | 11/2010 | Espiau et al. | |
| 8,282,435 B2 | 10/2012 | Espiau | |
| 8,283,866 B2 | 10/2012 | Espiau et al. | |
| 8,294,368 B2 | 10/2012 | Espiau et al. | |
| 8,545,067 B2 | 10/2013 | Espiau | |
| 2005/0094940 A1 | 5/2005 | Gao | |
| 2005/0095946 A1 | 5/2005 | Fridrich | |
| 2005/0212456 A1 | 9/2005 | Espiau et al. | |
| 2006/0250090 A9 | 11/2006 | Guthrie | |
| 2007/0109069 A1 | 5/2007 | Espiau et al. | |
| 2007/0222352 A1 | 9/2007 | DeVincentis et al. | |
| 2008/0054813 A1 | 3/2008 | Espiau et al. | |
| 2008/0227320 A1 | 9/2008 | Witham et al. | |
| 2009/0284166 A1* | 11/2009 | DeVincentis | H05B 41/24 315/248 |
| 2010/0134008 A1 | 6/2010 | Espiau et al. | |
| 2012/0014118 A1 | 1/2012 | Espiau et al. | |

OTHER PUBLICATIONS

Inada "Action spectra for photosynthesis in higher plants," Plant Cell Physiol 17:355-365 (1976).

McCree, "The action spectrum, absorptance and quantum yield of photosynthesis in crop plants," Agricultural Meterology 9:191-216 (1972).

Sager et al. "Radiation," Chapter 1, *Plant Growth Chamber Handbook*, R.W. Langhans and T.W. Tibbitts, eds, Iowa State University (1997).

International Search Report and Written Opinion of PCT Application No. PCT/US09/048174, mailed on Aug. 17, 2009, 17 pages total.

\* cited by examiner

PLASMA GROWTH LAMP FOR HORTICULTURE

CROSS-REFERENCES TO RELATED APPLICATIONS

This application is related to U.S. Pat. No. 7,830,092 issued Nov. 9, 2010, and titled "Electrodeless lamps with externally-grounded probes and improved bulb assemblies," commonly assigned, and hereby incorporated by reference in its entirety. This application is also related to the following documentation and references, each of which is incorporated by reference herein: K. J. McCree, The action spectrum, absorptance and quantum yield of photosynthesis in crop plants, Agr. Meteorol. 9, 191 (1972), K. Inada, Action spectra for photosynthesis in higher plants, Plant Cell Physio. 17, 331 (1976), and J. C. Sager and J. C. McFarlane, Chapter 1 Radiation, in Plant Growth Chamber Handbook, R. W. Langhans and T. W. Tibbitts, eds, (Iowa State University, Iowa, 1997).

BACKGROUND OF THE INVENTION

The present invention relates generally to lighting techniques. In particular, the present invention provides a method and device using a plasma lighting device. More particularly, the present invention relates to a plasma lamp developed for horticulture applications. The plasma lamp developed can be used for growth of various plants, including vegetables, fruits, flowers, algae, and other plants requiring light for growth.

Plant growth generally requires radiation in the 400 nm to 700 nm range of the spectrum (Photosynthetically Active Radiation, PAR). Photosynthesis is most efficient with red spectrum radiation where the photosynthetic quantum efficiency broadly peaks between ~600 nm and 670 nm [McCree, Inada]. There is also a blue spectrum radiation peak at ~450 nm that is ~30% lower relative to the red spectrum peak. In addition to providing the energy source for the plant, radiation also stimulates various aspects of plant development, such as germination, flowering, stem length, etc. (photomorphogenesis). Red and blue radiation also drives these photomorphogenesis characteristics [Sager & McFarlane]. The optimum ratio of the amount of red to blue radiation required for plant growth varies over the development of the plant. For example, a higher blue component of radiation is often desirable during seedling growth, whereas a higher red content in the spectrum can be desirable for germination and flowering. One current lighting technique presently used in horticulture to provide blue light spectrum during the initial stages and red light spectrum during the flowering stage is to use fluorescent light bulbs for the blue spectrum and then later on switch to incandescent light bulb for the red spectrum. The problem with this approach is that neither of the two light sources can provide the high intensity per area needed in a number of horticulture application and the incandescent light sources are very inefficient. In another approach metal halide lamps are used for initial growth stage when the blue spectrum is needed and high pressure sodium lamps for the red spectrum stages. The problem with this approach is typically plants have to be physically relocated from one location to another to provide the different light spectrums and metal halides lamps are also inefficient. To eliminate the need for relocating the plants and the need for using metal halide lamps, a special HPS lamp has been developed that adds a small blue spectrum peak to the spectrum of HPS (HortiLux). However, the overall spectrum of this lamp is also inadequate for optimum plant growth and still the overall energy consumption is too high.

In yet another approach array of blue and red LEDs have been used to develop a light fixture having the blue and red spectrum peaks used for plant growth. However, due to do the array nature of the LEDs in the fixture, it is challenging to get a uniform intensity distribution over an area with a uniform light spectrum. So different plants (or parts of the same plant) get different spectrum of light depending on their location under the light source.

From the above, it is seen that improved techniques for horticulture lighting is highly desired.

BRIEF SUMMARY OF THE INVENTION

According to the present invention, techniques for horticultural lighting is provided. More particularly, the present invention relates to horticulture applications for plasma lamps. In particular, the present invention provides a single plasma lamp with a spectrum that provides peaks in the blue range of the spectrum 400 nm to 470 nm needed for early growth cycle of the plant as well as peaks in the red range of the spectrum 600 nm to 700 nm needed for flowering cycle while providing lower amount of light in the green spectral region which is typically reflected by the plants.

Another form of lighting is commonly called electrodeless plasma lamp, which can be used to discharge light for high intensity applications. In a preferred embodiment, this invention provides a light source that produces a spectral distribution optimized for plant photosynthesis and the light source has the ability to vary the ratio of the red to blue components of the spectrum to optimize the desired plant development characteristics at each stage of growth.

The light source has a bulb without any electrodes inside the bulb and an RF source that couples RF energy to the bulb using an impedance transforming or matching element such as a resonator. The bulb design has a quartz bulb filled with a noble gas (e.g., Argon), mercury, indium halide (e.g. Indium bromide, InBr), and various rare-earth halides (e.g., $TmBr_3$). Adjusting the types and quantities of the rare-earth halide component allows one to design bulbs having different spectral distributions. A dysprosium halide rare-earth component is found to produce a spectrum particularly suitable for plant growth. The monohalide emission for DyBr matches the spectral photosynthesis efficiency. The indium halide component of the bulb design provides a high density of metal indium in the plasma, which is the principle source of ions. In addition, the indium metal emits very strong atomic radiation in the blue region of the spectrum. The emission is ideally suited to provide the blue component needed for photosynthesis and photomorphogenesis. While dysprosium halides and indium halides are used for the bulbs in this invention, other combination of rare-earth halides are possible as well.

The ratio of the number of photons in the red part of the spectrum to the number in the blue can be precisely controlled by adjusting the power to the lamp. As the lamp power is lowered the red component decreases nearly linearly with power. The blue component, however, remains nearly constant down to approximately 50% of full power. The input power to the plasma generates the red emitting monohalide and the density of this molecule decreases with decreasing power. As input power is decreased one would expect less excitation of the indium metal (less indium metal is produced by the dissociation of the indium halide), and thus, a decrease in the blue emission as well. The blue indium emission is produced between an excited state and the ground state of the indium atom—thus, there is a high probability that this radiation will be reabsorbed by other indium atoms and be trapped in the plasma. As the metal atom density decreases more of this "resonance" radiation can escape, so that even though there are fewer blue photons produced as the power is decreased, they have a higher probability of escaping the bulb. The net result is that the number of blue photons emitted from the bulb is nearly constant.

One embodiment of this invention has a cylindrical quartz envelope with domed ends such that the length of the bulb is 20 mm, the diameter is 10 mm, and the wall thickness is 1 mm. The envelope is filled with 300 torr of pure argon gas, 5.0 mg of mercury, 0.5 mg of InBr, and 0.1 mg of $DyBr_3$. The quartz envelope is mounted to an aluminum post that is inserted into the microwave resonator. 170 W of RF power is coupled to the resonator which is then coupled to the gases in the quartz envelope. By having a single high intensity light source with peaks in both the blue spectrum range and the red spectrum range simultaneously one can achieve a uniform light distribution with the same spectrum across all the plants. Furthermore by having both key wavelengths always available, the plants can shift from one metabolic process (stem growth) to another metabolic process (flowering) seamlessly.

An example of a lamp structure that can be configured with the present technique is described in U.S. Pat. No. 7,830,092 issued Nov. 9, 2010, and titled "Electrodeless lamps with externally-grounded probes and improved bulb assemblies," commonly assigned, and hereby incorporated by reference in its entirety.

The present invention achieves these benefits and others in the context of known process technology. However, a further understanding of the nature and advantages of the present invention may be realized by reference to the latter portions of the specification and attached drawings.

BRIEF DESCRIPTION OF THE DRAWINGS

A more complete understanding of the present invention and its advantages will be gained from a consideration of the following description of preferred embodiments, read in conjunction with the accompanying drawings provided herein. In the figures and description, numerals indicate various features of the invention, and like numerals referring to like features throughout both the drawings and the description.

DETAILED DESCRIPTION OF THE INVENTION

According to the present invention, techniques for horticulture lighting is provided. More particularly, the present invention relates to horticulture applications for plasma lamps. In particular, the present invention provides a single plasma lamp with a spectrum that provides peaks in the blue range of the spectrum 400 nm to 470 nm needed for early growth cycle of the plant as well as peaks in the red range of the spectrum 600 nm to 700 nm needed for flowering cycle while providing lower amount of light in the green spectral region which is typically reflected by the plants.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object. Additionally, the terms "first"

and "second" or other like descriptors do not necessarily imply an order, but should be interpreted using ordinary meaning.

Figure 1:
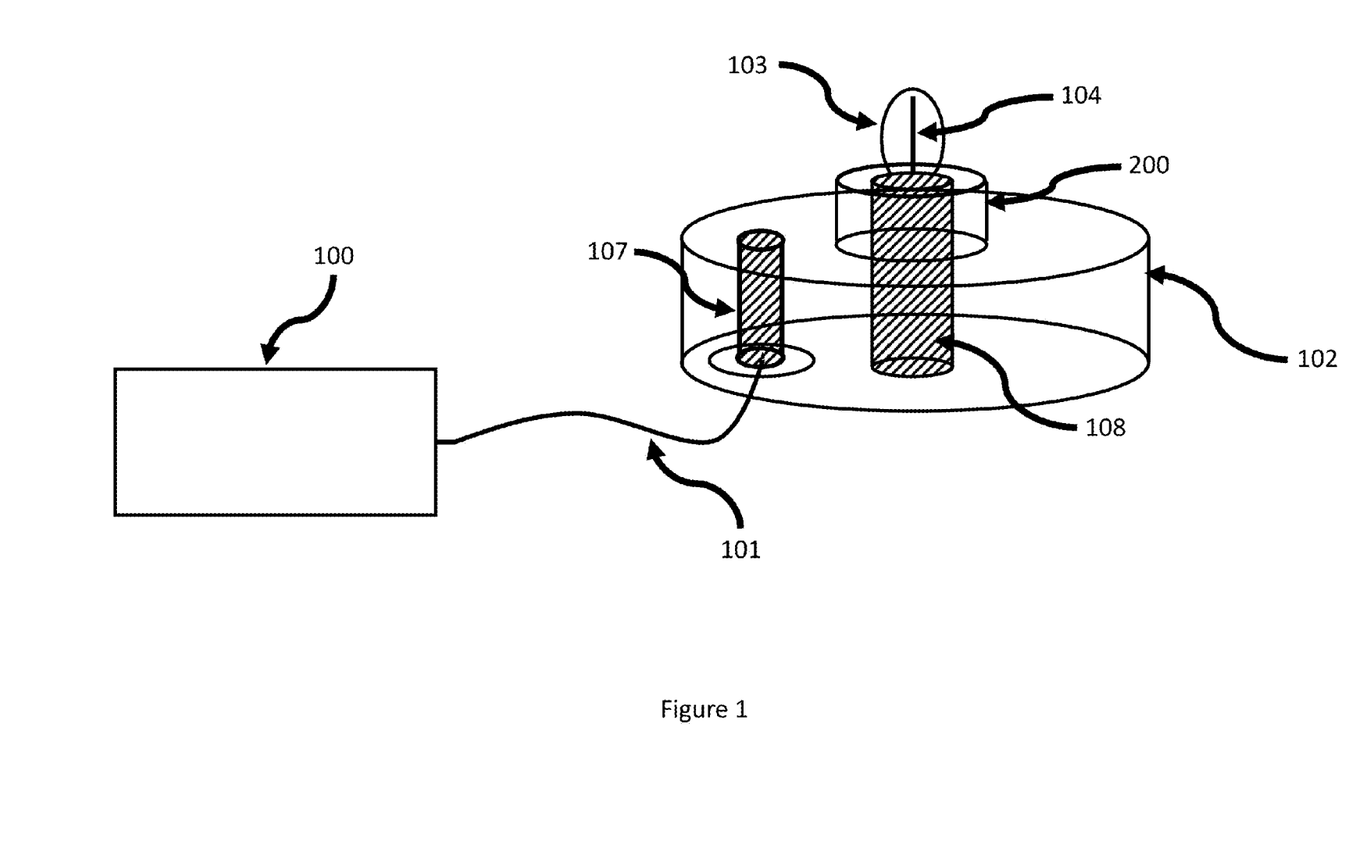
FIG. 1 illustrates a representation of an electrodeless plasma lamp apparatus with a compact air resonator. In the gas-filled bulb light emitters are used to give light emission with peaks in the blue and red spectrum range.

FIG. 1 illustrates a representation of an electrodeless plasma lamp apparatus with a compact air resonator. An RF driver (100) supplies RF energy to a second coupling element (107) by an RF cable (101), probe, or other structure and transfers the RF energy to a first coupling element (108) housed in the lamp body (102) (also referred to as the resonator structure) with a raised metal neck (200) structure. The first coupling element (108) couples the RF energy to a gas-filled bulb (103). In a specific embodiment, the gas-filled bulb is made of a suitable material such as quartz or other transparent or translucent material. The gas-filled vessel is filled with an inert gas such as Argon and a combination of light emitters such as Mercury, Dysprosium Bromide and Indium Bromide. Of course it is possible to have other combination of light emitters. The transferred RF energy excites a plasma arc (104) which discharges electromagnetic energy primarily in the form of light with a spectrum that has peak regions in the blue and red spectrum range for horticulture applications. In this embodiment the resonator has a compact air resonator but there can be other variations, modifications, and alternatives. This illustration is merely an example, which should not unduly limit the scope of the claims herein. One of ordinary skill in the art would recognize other variations, modifications, and alternatives.

Figure 2:
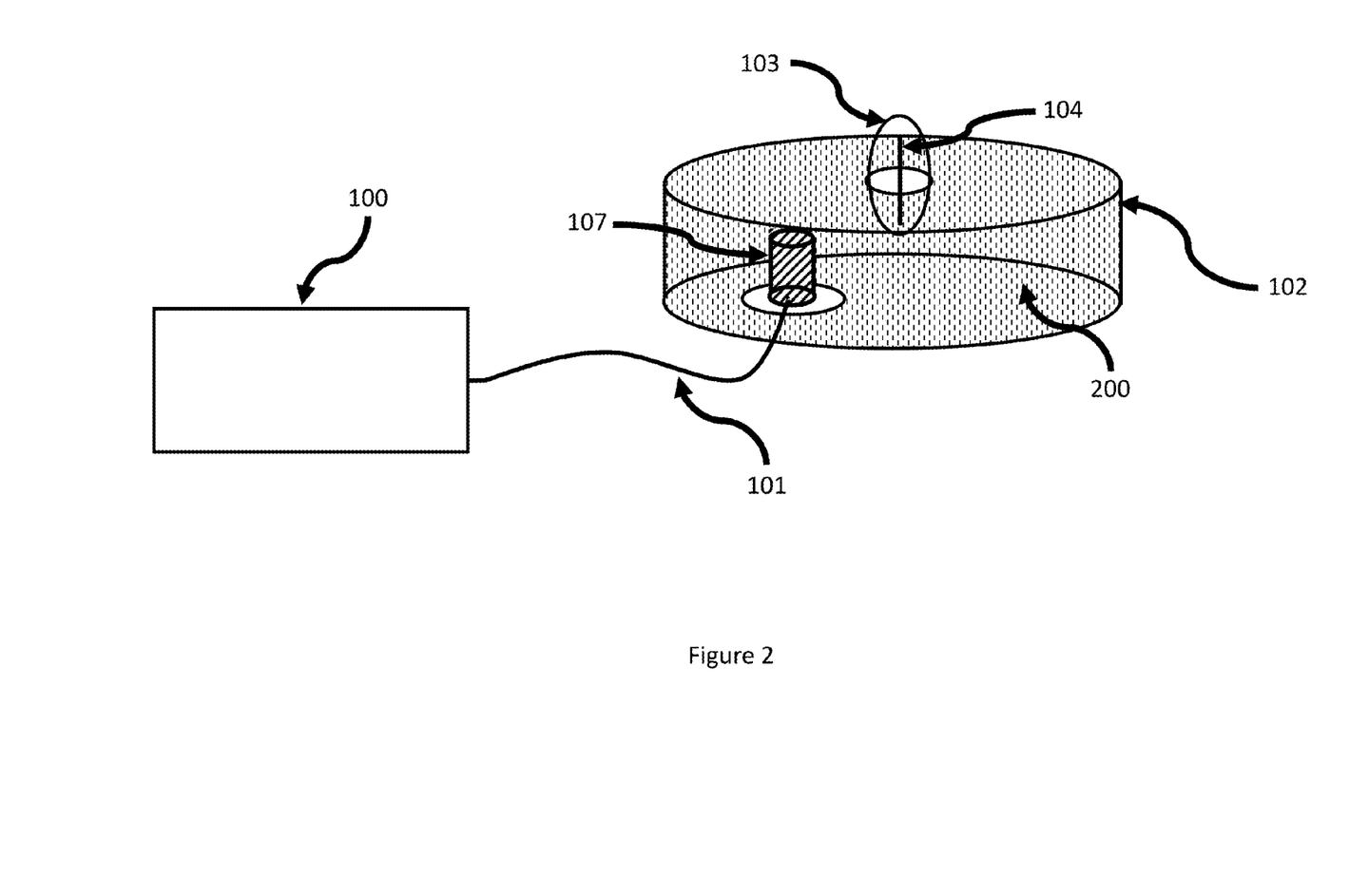
FIG. 2 illustrates a representation of an electrodeless plasma lamp apparatus with a dielectric resonator. In the gas-filled bulb light emitters are used to give light emission with peaks in the blue and red spectrum range.

FIG. 2 illustrates a representation of an electrodeless plasma lamp apparatus with a dielectric resonator. This diagram is merely an example, which should not unduly limit the scope of the claims herein. One of ordinary skill in the art would recognize other variations, modifications, and alternatives. An RF driver (100) supplies RF energy to a coupling element (107) by an RF cable (101). The coupling element couples RF energy to a resonator (102) which is made from a dielectric material (200) such as Alumina. A gas-filled bulb (103) is partially inside the dielectric resonator and is positioned at or near the peak electric field inside the dielectric resonator. In a specific embodiment, the gas-filled bulb is made of a suitable material such as quartz or other transparent or translucent material. The gas-filled vessel is filled with an inert gas such as Argon and contains a combination of light emitters such as Mercury, Dysprosium Bromide and Indium Bromide. Of course it is possible to have other combination of light emitters. The transferred RF energy excites a plasma arc (104) which discharges electromagnetic energy primarily in the form of light with a spectrum that has peak regions in the blue and red spectrum range for horticulture applications.

Figure 3:
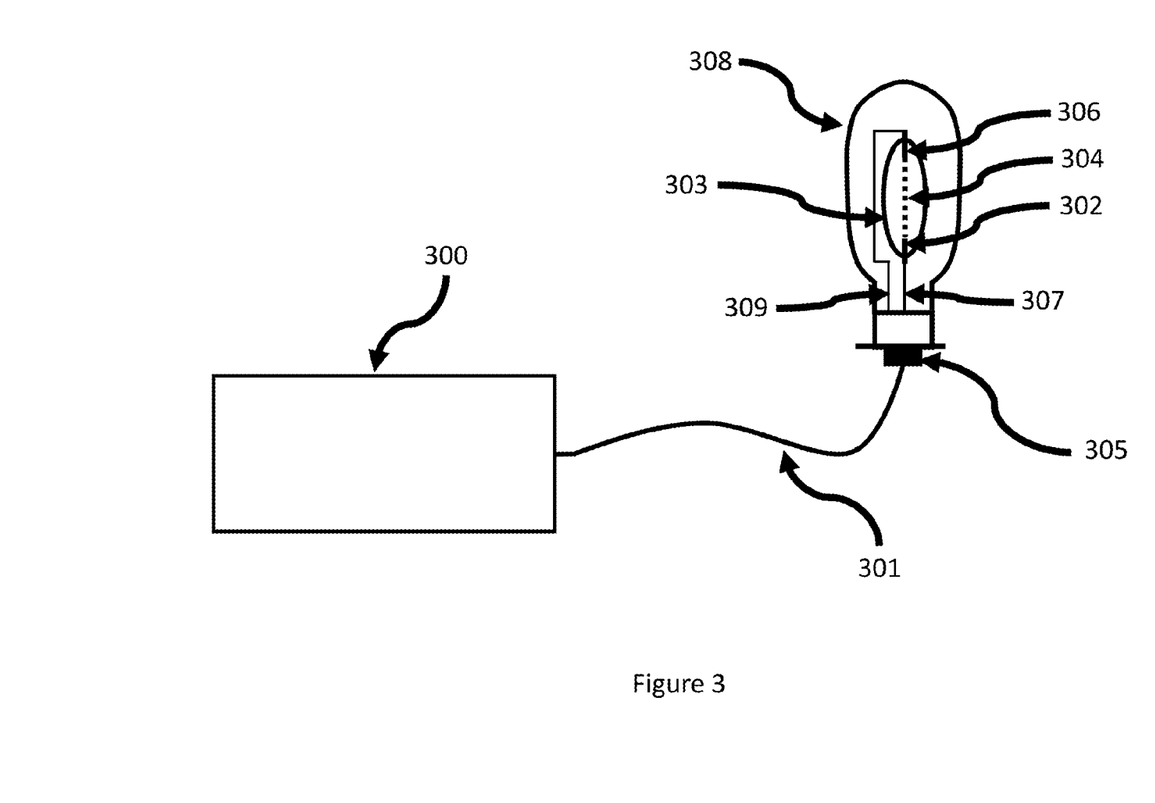
FIG. 3 illustrates a representation of an electroded metal halide lamp apparatus. In the gas-filled bulb light emitters are used to give light emission with peaks in the blue and red spectrum range.

FIG. 3 illustrates a representation of an electroded metal halide lamp apparatus. The ballast (300) increases the peak of the voltage AC input and transfers it through cable (301) to an electroded bulb (308) through contact (305) on the bulb. Wires (307) and (309) transfer the AC input to electrodes (302) and (306) that protrude the walls of the inner bulb (303). The inner bulb (303) contains an inert gas such as Argon and a combination of light emitters such as Mercury and metal halides. The AC voltage applied to the bulb ionizes the gases and vaporizes light emitters forming an arc (304) which emits intense light with a spectrum with peaks in the blue and red regions of the spectrum range. This illustration is merely an example, which should not unduly limit the scope of the claims herein. One of ordinary skill in the art would recognize other variations, modifications, and alternatives.

Figure 4:
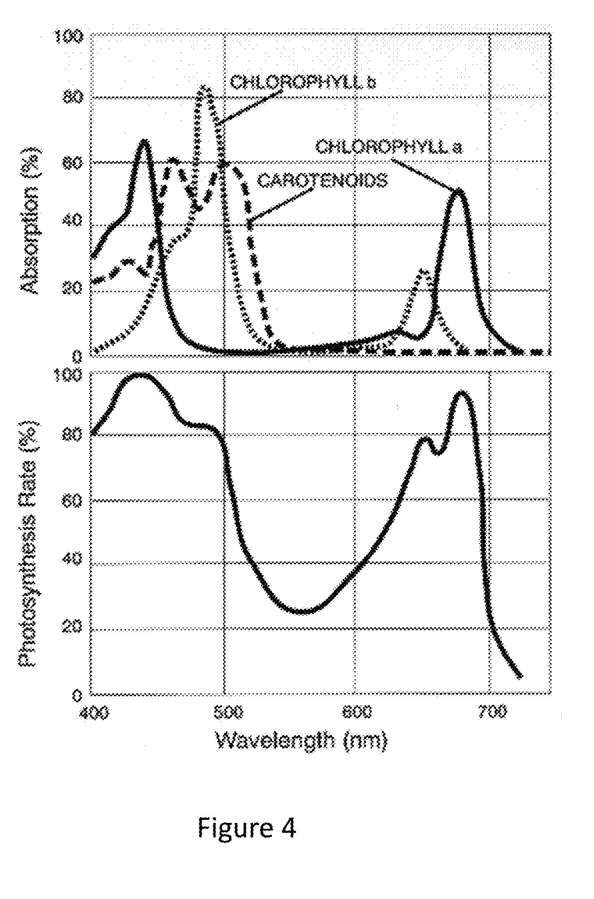
FIG. 4 shows plot of a typical absorption percentage and photosynthesis rate versus wavelength of light for the photo synthetically active components of a plant.

FIG. 4 shows plot of typical absorption percentages as a function of wavelength of light by different chlorophylls and carotenoids for a typical plant. The figure also shows typical plot of photosynthesis rate versus wavelength of light for a chloroplast from a plant.

Figure 5:
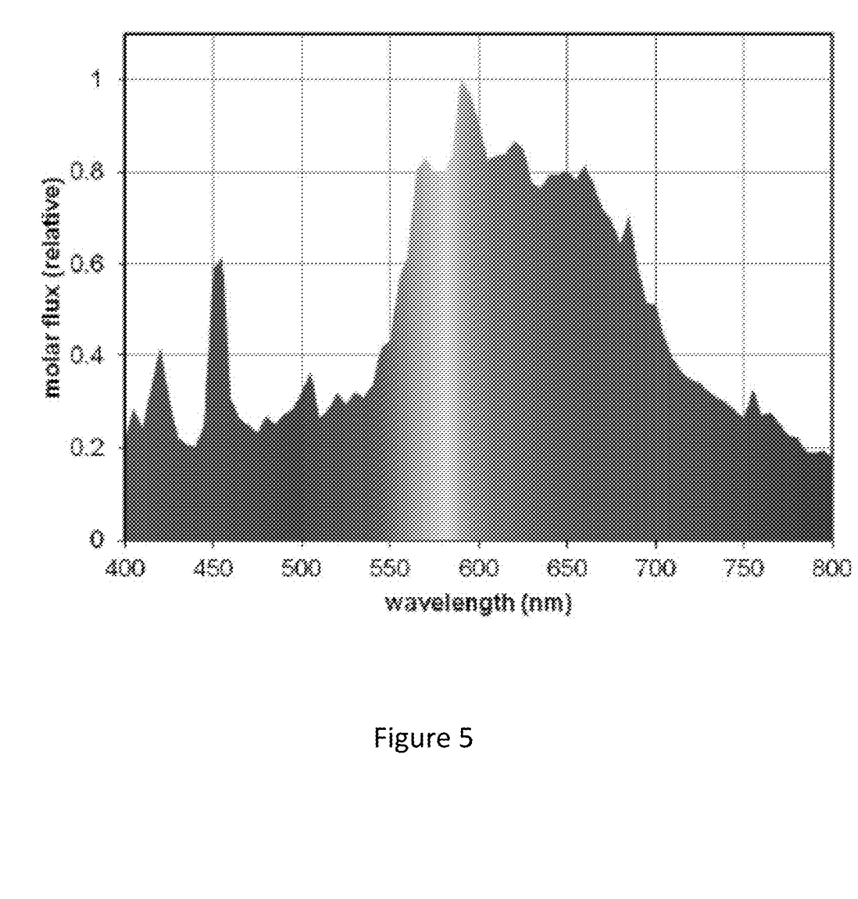
FIG. 5 shows plot of the spectrum of light emitted by a typical plasma lamp from an embodiment of this invention.

FIG. 5 shows plot of the spectrum of light emitted by a typical plasma lamp from an embodiment of this invention. The spectrum shows peak in the blue (400 to 470 nm) range of the spectrum and in the red (600 to 670 nm) range of the spectrum.

Figure 6:
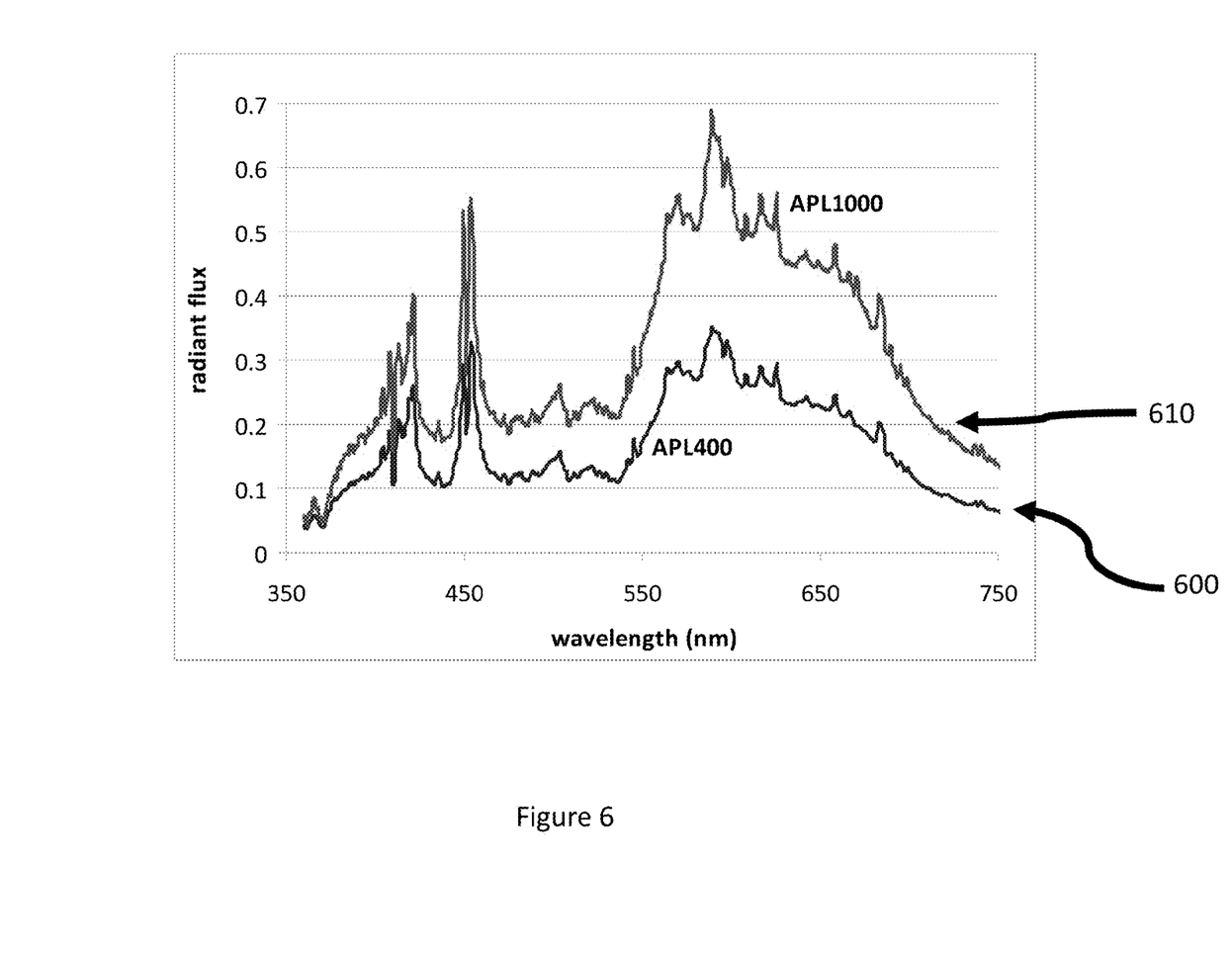
FIG. 6 shows plot of the spectrum of light emitted by two plasma lamps with different RF power levels from two embodiments of this invention.

FIG. 6 shows plot of the spectrum of light emitted by two plasma lamps with different RF power levels from two embodiments of this invention. In one embodiment (600) 170 watts of RF power is coupled to the resonator and in the other embodiment (610) 340 watts of RF power is coupled to the resonator.

Figure 7:
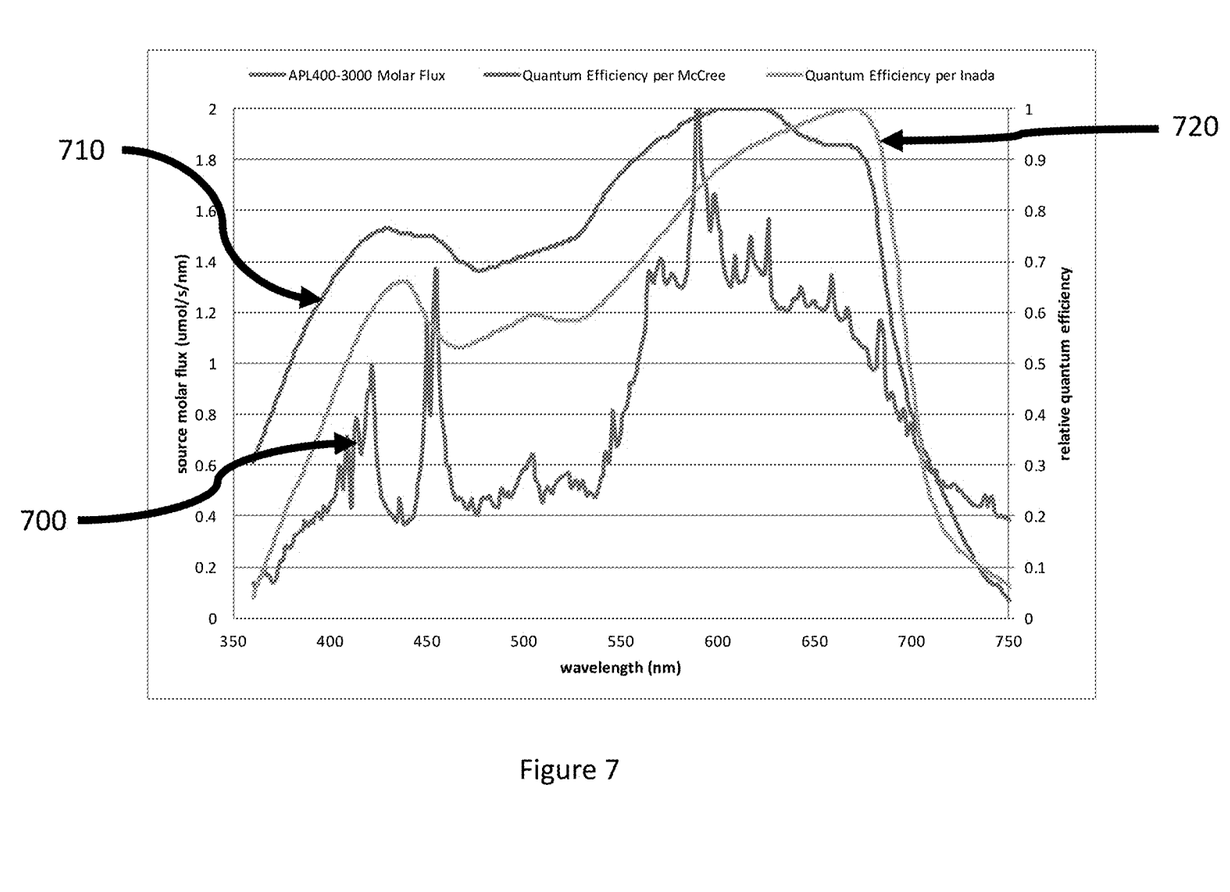
FIG. 7 shows plot of the spectrum of light emitted by a typical plasma lamp from an embodiment of this invention along with comparison with two different models from literature for photosynthetic quantum efficiency

FIG. 7 shows plot of the spectrum of light emitted by a typical plasma lamp (700) from an embodiment of this invention along with comparison with the photosynthetic quantum efficiency model by McCree (710) and by Inada (720).

Figure 8:
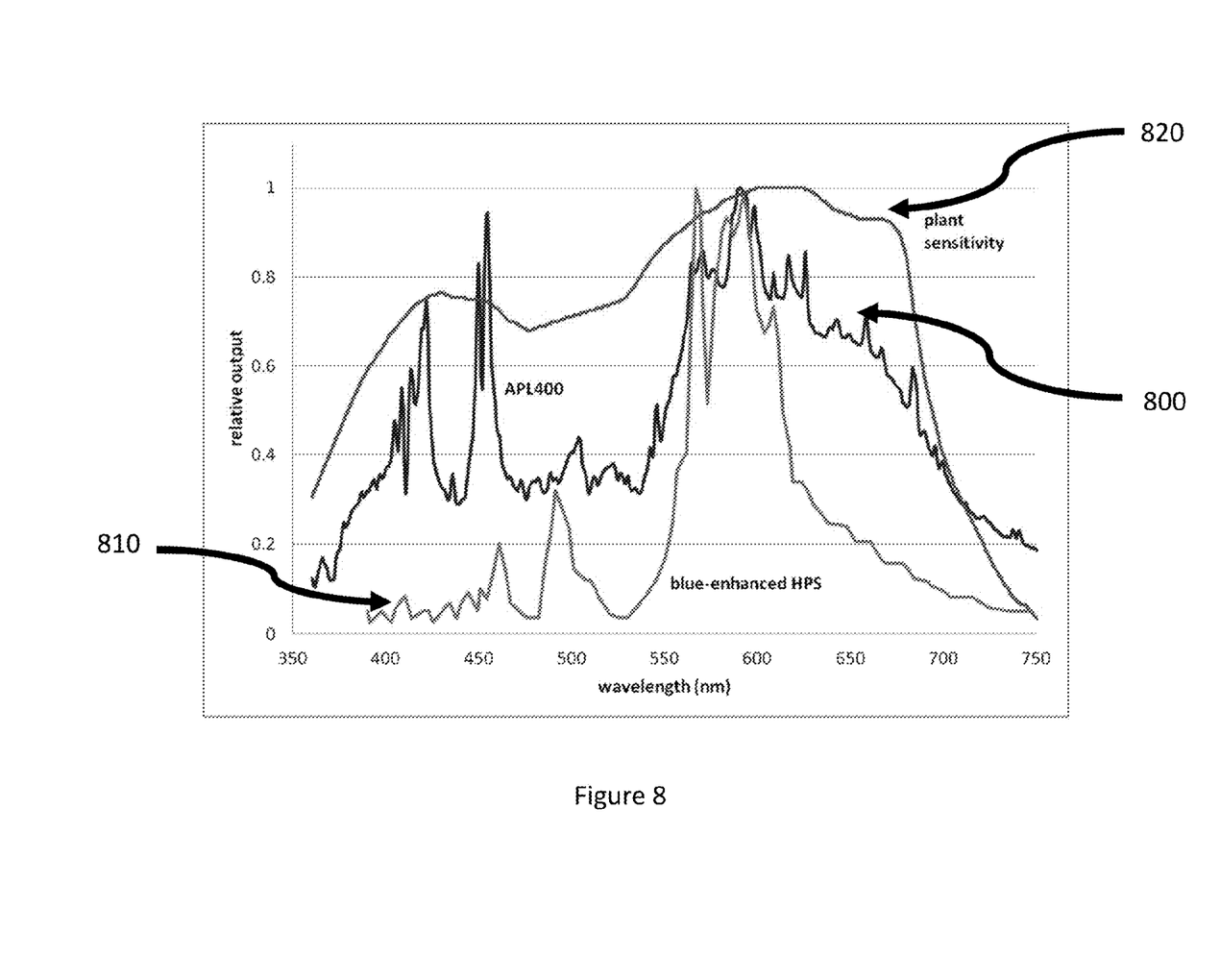
FIG. 8 shows plot of the spectrum of light emitted by a typical plasma lamp from an embodiment of this invention along with comparison to the spectrum of high-pressure sodium (HPS) lamp used for horticulture applications.

FIG. 8 shows plot of the spectrum of light emitted by a typical plasma lamp (800) from an embodiment of this invention along with comparison to the spectrum of high-pressure sodium (HPS) (810) lamp with enhance blue spectrum called Hortilux used for horticulture applications and comparison with efficiency model (820) for plants from the literature.

Figure 9:
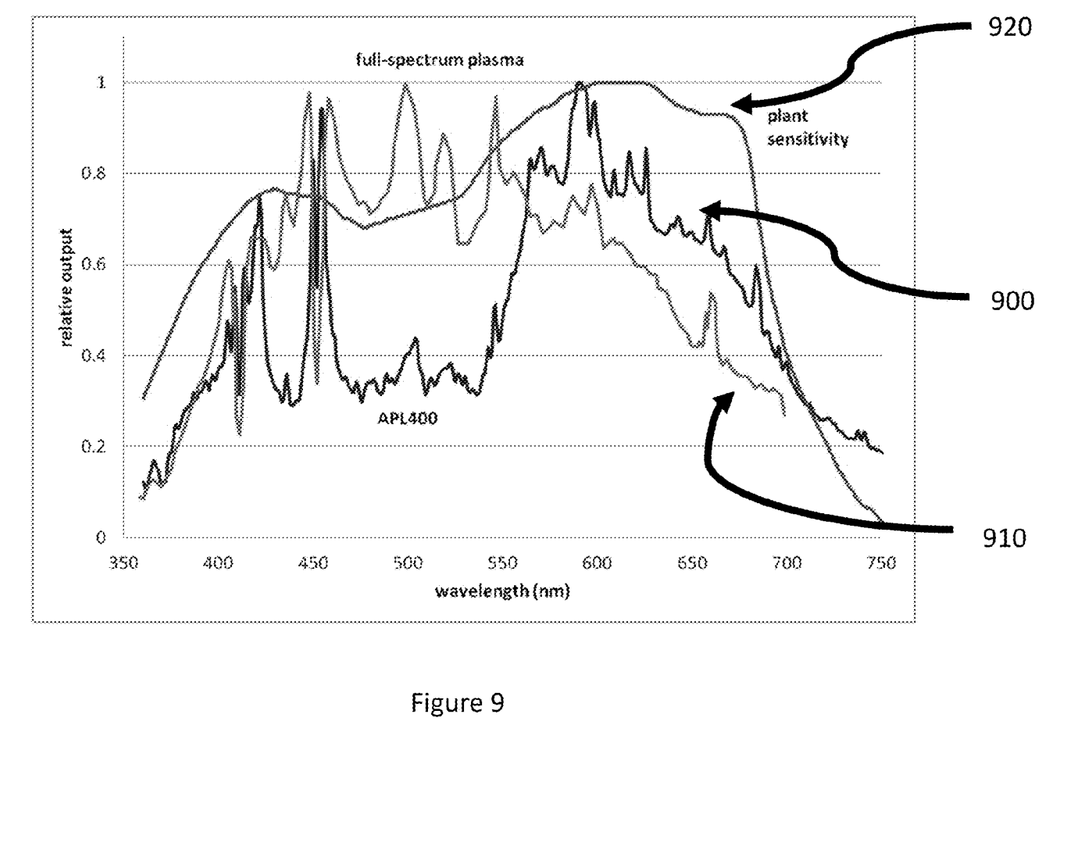
FIG. 9 shows plot of the spectrum of light emitted by a typical plasma lamp from an embodiment of this invention along with comparison to the spectrum of a typical plasma lamp made by a different supplier of plasma lamps for horticulture applications.

FIG. 9 shows plot of the spectrum of light emitted by a typical plasma lamp (900) from an embodiment of this invention along with comparison to the spectrum of a typical plasma lamp (910) made by a different supplier of plasma lamps for horticulture applications versus the plot of plant sensitivity curve (920). Note that the plasma lamp in this invention has significantly higher levels of red spectrum which is important for flowering stage of the plants. Furthermore the plasma lamp in this invention (900) has significantly less green spectrum than the other supplier's plasma lamp (910). Since green spectrum is primarily reflected by the plants, the energy that is consumed to produce the green spectrum by plasma lamp (910) is partially wasted. This results in more efficient operation of the plasma lamp in this invention (900) compared to other plasma lamps.

Figure 10:
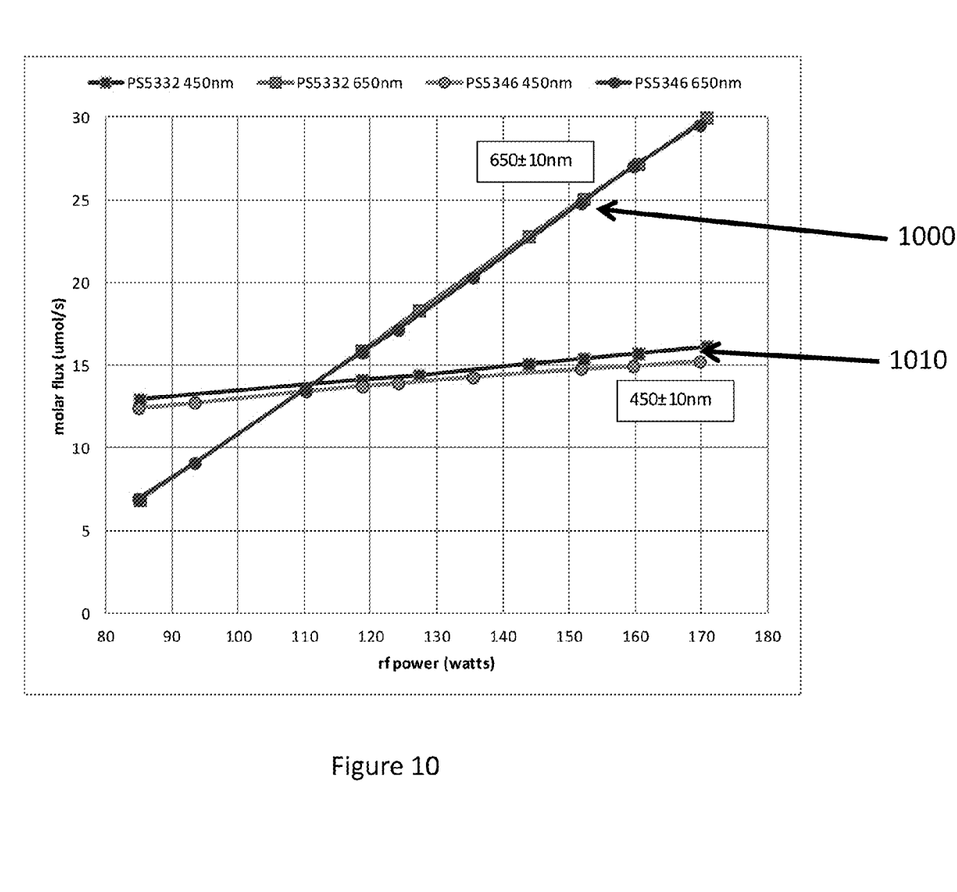
FIG. 10 shows changes in the red spectrum and the blue spectrum of a typical plasma lamp from an embodiment of this invention as the RF input power is varied.

FIG. 10 shows changes in the red spectrum (1000) and the blue spectrum (1010) of a typical plasma lamp from an embodiment of this invention as the input RF power is varied. As the RF input power is lowered the red spectrum drops much more rapidly than the blue spectrum.

This allows the ratio of the red to blue spectrum to be controlled by changing the input RF power level to the lamp. Depending on the growth stage of plants, the plants require different amounts of blue and red spectrum so by varying the input RF power level the spectrum can be optimized for various growth stages.

In an example, the present invention includes techniques for horticulture applications. As used herein, horticulture is technically the science, technology, and business involved in intensive plant cultivation for human use, although there are variations. See, Wikipedia. "It is practiced from the individual level in a garden up to the activities of a multinational corporation. It is very diverse in its activities, incorporating plants for food (fruits, vegetables, mushrooms, culinary herbs) and non-food crops (flowers, trees and shrubs, turf-grass, hops, medicinal herbs). It also includes related services in plant conservation, landscape restoration, landscape and garden design/construction/maintenance, arboriculture, horticultural therapy, and much more. This range of food, medicinal, environmental, and social products and services are all fundamental to developing and maintaining human health and well-being."

Plant growth generally requires radiation in the 400-700 nm range (Photosynthetically Active Radiation, PAR). Photosynthesis is most efficient with red radiation where the photosynthetic quantum efficiency broadly peaks between ~600 and 670 nm [McCree, Inada]; there is also a blue peak at ~450 nm that is ~30% lower relative to the red peak. In addition to providing the energy source for the plant, radiation also stimulates various aspects of plant development, such as germination, flowering, stem length, etc., (photomorphogenesis). Red and blue radiation also drives these photomorphogenesis characteristics [Sager & McFarlane]. The optimum ratio of the amount of red to blue radiation required for plant growth varies over the development of the plant, for example, a higher blue component of radiation is often desirable during seedling growth, whereas a higher red content in the spectrum can be desirable for germination and flowering.

The purpose of the invention described here is to provide a light source that 1) produces a spectral distribution optimized for plant photosysnthesis, and 2) has the ability to vary the ratio of the red to blue components of the spectrum to optimize the desired plant development characteristics at each stage of growth.

In an example, the present techniques uses a quartz bulb filled with a rare-gas (e.g., argon), mercury, indium halide (e.g., InBr), and various rare-earth halides (e.g., $TmBr_3$). Adjusting the types and quantities of the rare-earth halide component allows one to design bulbs having different spectral distributions. A dysprosium halide rare-earth component is found to produce a spectrum particularly suitable for plant growth. The present electrode-less techniques produce a unique spectrum that is not seen in traditional electroded metal halide lamps. The spectral output of present lamps is dominated by the emission from the rare-earth monohalide rather than atomic metal line emission, as is the case for electroded lamps. The monohalide emission for DyBr nicely matches the spectral photosynthesis efficiency, FIG. 7. The indium halide component of the bulb design provides a high density of metal indium in the plasma, which is the principle source of ions. In addition, the indium metal emits very strong atomic radiation in the blue region of the spectrum. This emission is ideally suited to provide the blue component needed for photosynthesis and photomorphogenesis.

In an example, the ratio of the number of photons in the red part of the spectrum to the number in the blue can be precisely controlled by adjusting the power to the lamp. As the lamp power is lowered the red component decreases nearly linearly with power. The blue component, however, remains nearly constant down to approximately 50% of full power (FIG. 10). This result is unique to the present techniques. The input power to the plasma generates the red emitting monohalide and the density of this molecule decreases with decreasing power. As input power is decreased one would expect less excitation of the indium metal (less indium metal is produced by the dissociation of the indium halide), and thus, a decrease in the blue emission as well. The blue indium emission is produced between an excited state and the ground state of the indium atom—thus, there is a high probability that this radiation will be reabsorbed by other indium atoms and be trapped in the plasma. As the metal atom density decreases more of this "resonance" radiation can escape, so that even though there are fewer blue photons produced as the power is decreased, they have a higher probability of escaping the bulb. The net result is that the number of blue photons emitted from the bulb is nearly constant.

A preferred embodiment of this invention for operation at 170 watts has a cylindrical quartz envelope with domed ends such that the length of the bulb is 20 mm, the diameter is 10 mm, and the wall thickness is 1 mm. The envelope is filled with 300 torr of pure argon gas, 5.0 mg of mercury, 0.5 mg of InBr, and 0.1 mg of $DyBr_3$. The quartz envelope is mounted to an aluminum post that is inserted into the microwave resonator. Power is coupled to the gases in the plasma by driving the resonator with an appropriate microwave power supply. These desirable properties for plant growth can be achieved at other powers (e.g., 95 watts and 330 watts) with the appropriately scaled bulb dimensions and quantities of mercury and metal halides.

A plant growth light source would use the present lamp technique with the bulb having dysprosium halide dose. The bulb/resonator assembly would be coupled to a reflector to direct the light over the working area. With the lamp operating at a given power, a neutral density filter could be used to set the desired level of blue emission and the power then adjusted to set the desired level of red emission. A variable neutral density filter could be adjusted in real time along with the lamp power to change the ratio of the number of red photons to blue photons appropriate for each stage of plant growth.

In an example, the present invention provides a plasma lamp apparatus for growth as applied to horticulture. The apparatus has a bulb comprising a fill mixture and an RF source coupled to the bulb to initiate a discharge of electromagnetic radiation. The apparatus has a blue peak characterizing the electromagnetic radiation discharged from the bulb, the blue peak being a first local maximum intensity region, a red peak characterizing the electromagnetic radiation discharged from the bulb, the red peak being a second local maximum intensity region, and a green spectrum having an intensity less than 60% of either the blue peak or the red peak, the green spectrum being characterized by a local minimum intensity region.

In an example, the present invention provides a plasma lamp apparatus for growth as applied to horticulture. The apparatus has a bulb comprising a fill mixture, an RF source coupled to the bulb to initiate a discharge of electromagnetic radiation, among other elements. The apparatus has a blue peak characterizing the electromagnetic radiation discharged from the bulb, the blue peak being a first local maximum intensity region, a red peak characterizing the electromagnetic radiation discharged from the bulb, the red peak being a second local maximum intensity region, and a green spectrum having an intensity less than 60% of either the blue peak or the red peak, the green spectrum being characterized by a local minimum intensity region. The apparatus has an optical reflector to direct the electromagnetic radiation onto the area of interest, in which the opening of the reflector, through which the electromagnetic radiation exits through an aperture region, is covered with an optically transparent filter that is configured to modify a spectrum of the electromagnetic radiation before reaching the area of interest; and a filter coupled to the bulb to reduce primarily a blue part of the spectrum between 400 and 500 nm, the filter is configured to have at least one level of intensity reduction, or is configured to have multiple selectable levels of intensity reduction in a variable configuration. In an example, the reflectivity of the reflector is lower for the red part of the spectrum between 550 and 700 nm or the reflectivity of the reflector is lower for the blue part of the spectrum between 400 and 500 nm.

Further information about photosynthesis and plant growth can be found in the following documentation and references, each of which is incorporated by reference herein.

K. J. McCree, The action spectrum, absorptance and quantum yield of photosynthesis in crop plants, Agr. Meteorol. 9, 191 (1972).

K. Inada, Action spectra for photosynthesis in higher plants, Plant Cell Physio. 17, 331 (1976).

J. C. Sager and J. C. McFarlane, Chapter 1 Radiation, in Plant Growth Chamber Handbook, R. W. Langhans and T. W. Tibbitts, eds, (Iowa State University, Iowa, 1997).

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A plasma lamp apparatus for growth as applied to horticulture, the apparatus comprising:
    a bulb comprising a fill mixture;
    an RF source coupled to the bulb to initiate a discharge of electromagnetic radiation;
    a blue peak characterizing the electromagnetic radiation discharged from the bulb, the blue peak being a first local maximum intensity region;
    a red peak characterizing the electromagnetic radiation discharged from the bulb, the red peak being a second local maximum intensity region; and
    a green spectrum having an intensity less than 60% of either the blue peak or the red peak, the green spectrum being characterized by a local minimum intensity region.

2. The apparatus of claim 1 wherein the bulb comprises an arc tube structure configured with an aspect ratio ranging from about three halves to about three.

3. The apparatus of claim 2 wherein the arc tube structure comprises a quartz material.

4. The apparatus of claim 2 wherein the arc tube structure comprises a translucent alumina.

5. The apparatus of claim 2 wherein the arc tube structure comprises the fill material.

6. The device of claim 1 wherein the fill material is configured to discharge the electromagnetic radiation having the red peak and the blue peak.

7. The apparatus of claim 1 wherein the fill material comprises 300 torr of argon gas, 5.0 mg of mercury, 0.5 mg of InBr, and 0.1 mg of DyBr3, and substantially no thulium bromide.

8. The apparatus of claim 1 wherein the fill material comprises 300 torr of argon gas, 5.5 mg of mercury, 0.3 mg of InBr, 0.1mg of DyBr3, and 0.1 mg of LiBr.

9. The apparatus of claim 1 wherein the fill material comprises mercury ranging from about 2 to about 10 mg/cm$^3$.

10. The apparatus of claim 1 wherein the fill material comprises dysprosium bromide ranging from about 0.05 to about 0.3 mg/cm$^3$.

11. The apparatus of claim 1 wherein the fill material comprises indium bromide ranging from about 0.5 to about 2 mg/cm$^3$.

12. The apparatus of claim 1 wherein the fill material comprises lithium bromide ranging from 0 to about 0.3 mg/cm$^3$.

13. The apparatus of claim 1 wherein the fill material comprises a determined amount of dysprosium bromide to cause a selected color temperature.

14. The apparatus of claim 13 wherein the selected color temperature ranges from about 2800 to about 4000 Kelvin.

15. The apparatus of claim 1 further comprising a variable power RF source that is configured to reduce an output power from a full power to about 20% of the full power.

16. The apparatus of claim 1 further comprising an optical reflector to direct the electromagnetic radiation onto an area of interest, in which an opening of the reflector, through which the electromagnetic radiation exits through an aperture region, is covered with an optically transparent filter that is configured to modify a spectrum of the electromagnetic radiation before reaching the area of interest.

17. The apparatus of claim 16 further comprising a filter coupled to the bulb to uniformly reduce an intensity of the electromagnetic radiation between about 400 and about 700 nm (neutral density filter), wherein the filter is configured to have one level of intensity reduction, or is configured to have multiple selectable levels of intensity reduction using a variable configuration.

18. The apparatus of claim 16 further comprising a filter coupled to the bulb to reduce primarily a red part of the spectrum between 550 and 700 nm, the filter is configured to have at least one level of intensity reduction, or is configured to have multiple selectable levels of intensity reduction in a variable configuration.

19. A plasma lamp apparatus for growth as applied to horticulture, the apparatus comprising:
    a bulb comprising a fill mixture;
    an RF source coupled to the bulb to initiate a discharge of electromagnetic radiation;
    a blue peak characterizing the electromagnetic radiation discharged from the bulb, the blue peak being a first local maximum intensity region;
    a red peak characterizing the electromagnetic radiation discharged from the bulb, the red peak being a second local maximum intensity region;
    a green spectrum having an intensity less than 60% of either the blue peak or the red peak, the green spectrum being characterized by a local minimum intensity region;
    an optical reflector to direct the electromagnetic radiation onto an area of interest, in which an opening of the reflector, through which the electromagnetic radiation exits through an aperture region, is covered with an optically transparent filter that is configured to modify a spectrum of the electromagnetic radiation before reaching the area of interest; and
    a filter coupled to the bulb to reduce primarily a blue part of the spectrum between 400 and 500 nm, wherein the filter is configured to have at least one level of intensity reduction, or is configured to have multiple selectable levels of intensity reduction in a variable configuration.

20. The apparatus of claim 19 wherein the reflectivity of the reflector is lower for the red part of the spectrum between 550 and 700 nm or wherein the reflectivity of the reflector is lower for the blue part of the spectrum between 400 and 500 nm.

* * * * *